United States Patent [19]

Hasegawa

[11] Patent Number: 5,537,518
[45] Date of Patent: Jul. 16, 1996

[54] DOCUMENT PROCESSING SYSTEM

[75] Inventor: Akihiro Hasegawa, Saitama, Japan

[73] Assignee: Fuji Xerox Co., Ltd., Tokyo, Japan

[21] Appl. No.: 451,475

[22] Filed: May 26, 1995

Related U.S. Application Data

[63] Continuation of Ser. No. 611,127, Nov. 9, 1990, abandoned.

[51] Int. Cl.⁶ .................................................. B06K 15/00
[52] U.S. Cl. ............................ 395/117; 395/111; 395/102
[58] Field of Search .................................. 395/102, 112, 395/117, 111; 355/309–311, 317; 558/452; 400/63, 64, 67, 68

[56]  References Cited

U.S. PATENT DOCUMENTS 4,908,672  3/1990  Ito ............................................ 355/311
4,964,070  10/1990  Markoff et al. ........................ 395/102
4,965,590  10/1990  Yamazaki ............................... 346/136

*Primary Examiner*—Arthur G. Evans
*Attorney, Agent, or Firm*—Finnegan, Henderson, Farabow, Garrett & Dunner

[57] ABSTRACT

A document processing system comprises a document data forming means for forming document data adapted to be printed on printing sheets having a first predetermined size, printing sheet selecting means, connected to the document data forming means, for selecting second printing sheets having a second predetermined size, the second predetermined size being larger than the first predetermined size by a specified area, and additional data forming means for forming additional data adapted to be printed in the specified area.

9 Claims, 5 Drawing Sheets

| PRINTER OPTION | | START | CANCELLATION |

| NUMBER OF COPIES | 1 | ONLY FORM |
| ORIGINAL'S SIZE | A5 | A4 | B5 | B4 |
| COVERED BINDING | YES |
| REGISTERING MARKS | YES |
| DOVE TAIL MARKS | YES |
| SHEET SIZE | A3 | A4 | B4 |
| COMMENT | |
| OUTPUT | FACSIMILE |
| PRINT | SORTING |
| PRINT FORMAT | UN-NECESSARY | NECESSARY | nt
DOCUMENT PROCESSING SYSTEM

This application is a continuation of application Ser. No. 07/611,127, filed Nov. 9, 1990, now abandoned.

BACKGROUND OF THE INVENTION

1. Field of the Invention

This invention relates to a document processing system for preparing printed documents, and more particularly to a document processing system wherein various marks, such as dovetail marks and registering marks, can be easily inserted on an output document, and wherein bound documents can be easily prepared because the original documents may be prepared unbound, page by page, in the ordinary manner.

2. Discussion of the Related Art

In document printing technology, a block copy is prepared with ink or the like in compliance with a document original. The block copy includes, for instance, additional data information, such as dovetail marks, registering marks and a covered binding, which are used to cut the prints, to overlap the block copy for multi-color printing, and so on.

FIG. 7 shows one example of an original 11 with such additional data 13. The original 11 includes a rectangular region 12 as indicated by the broken line, which corresponds to the size of the instant document original, and four side regions surrounding the rectangular region 12. For instance, sentences or pictures (not shown) included in the original document are provided in the rectangular region 12. The aforementioned additional data 13, are arranged in these side regions. In the case of FIG. 7, the registering marks are provided in the upper and lower side regions at the middle, and dovetail marks are provided at the four corners of the rectangular drawing.

The original 11 is printed on a recording sheet of predetermined size. In this case, the additional data 13 are utilized for a print aligning operation in a multi-color printing operation, or a print positioning operation in cutting the recording sheets to a predetermined size.

In the conventional arts, such an original is prepared as follows: The operator manually enters the additional data 13 on the original, or the original with the additional data is printed out with a special printer.

In the former case, it is necessary for the operator to enter the additional data 13 in the original to prepare a block copy. Thus, preparation of the block copy is time consuming.

In the latter case, the block copy is prepared as follows: A document original corresponding to the above-described rectangular region 12 is formed, and then the additional data are entered in the side regions surrounding the rectangular region 12. The block copy thus prepared is printed out with the special printer. Therefore, if the special printer is not available, the block copy cannot easily be prepared.

Heretofore, in a covered binding operation, image data of two pages to be folded are combined and printed out on one recording sheet. Therefore, a problem arises because the appearance of the image data cannot easily be confirmed until after the block copy is prepared.

SUMMARY OF THE INVENTION

The present invention has been made in view of the above circumstances. It is an object of the present invention to provide a document processing system which can prepare and manipulate a document with additional data, such as registering marks.

It is an another object of the invention to provide a document processing system in which bound documents can be easily edited because the document originals may be prepared unbound, page by page, in the ordinary manner.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, the document processing system, according to one aspect of the invention, comprises a document processing system comprising document data forming means for forming document data adapted to be printed on printing sheets having a first predetermined size, printing sheet selecting means, connected to the document data forming means, for selecting second printing sheets having a second predetermined size, the second predetermined size being larger than the first predetermined size by a specified area, and additional data forming means for forming additional data adapted to be printed in the specified area.

According to another aspect of the present invention, the document processing system comprises a document data forming means for forming document data adapted to be printed on printing sheets having a predetermined size, means for arranging the document data to form output data, the output data including two pages of the document data side by side, and printing sheet size inputting means for inputting the size of an output printing sheet large enough to allow the two pages of the document data to be printed on output printing sheet.

The accompanying drawings, which are incorporated in and constitute a part of this specification, illustrate an embodiment of the invention and, together with the description, serve to explain the objects, advantages and principles of the invention.

DETAILED DESCRIPTION OF THE PREFERRED EMBODIMENTS

This invention will be described with reference to the preferred embodiments.

Figure 2:
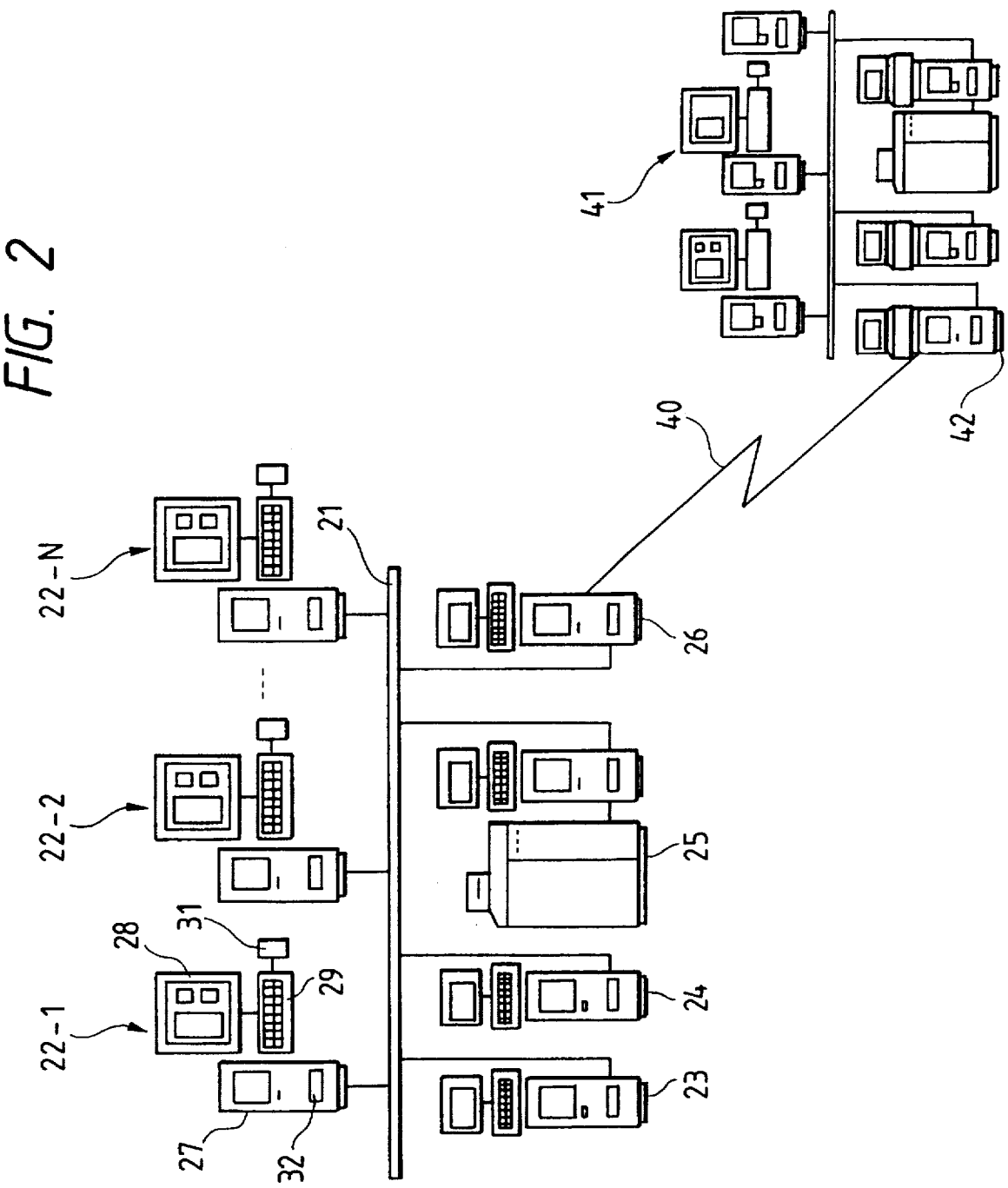
FIG. 2 is an explanatory diagram showing one example of a communication system which employs the document processing systems according to the invention.

FIG. 2 shows one example of a communication system employing document processing systems according to the invention.

In the communication system, a first communication cable 21 forming a local area network such as "Ethernet" is connected to a plurality of document processing systems (work stations) 22-1 through 22-N, a file server 23, a mail server 24, a print server 25, and a communication server 26.

In this embodiment, each of the document processing systems 22-1 through 22-N comprises a control section 27, a display unit 28, a key board 29, and a mouse 31 used as a pointing device.

The file server 23 holds files which are used by the local area network. The mail server 24 controls electronic mail. The print server 25 is used to print out documents, for instance, with a laser printer. The communication server 16 communicates with other local area networks through a communication line 40. FIG. 2 shows the communication server 26 connected to a communication server 42 thereby forming another local area network.

Electronic mail can be transmitted between document processing systems in the same local area network, and between two local area networks as well.

Figure 1:
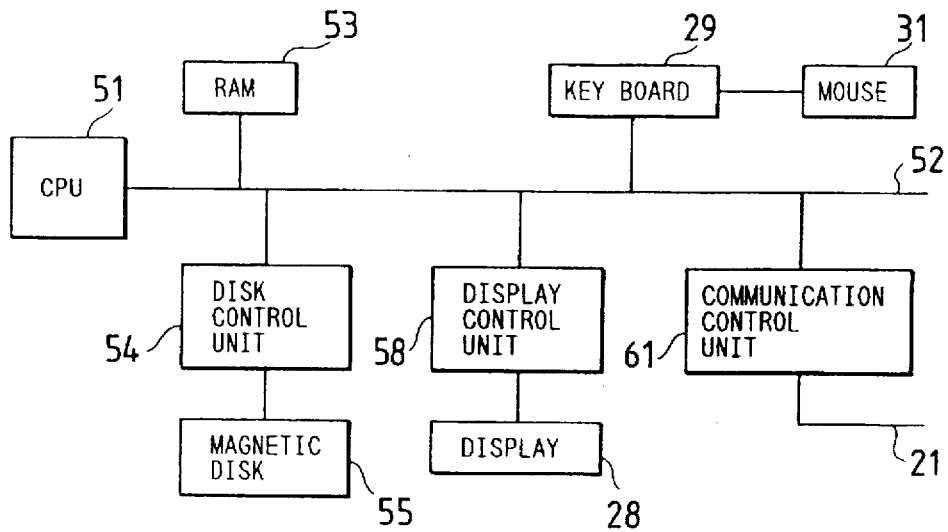
FIG. 1 is a block diagram showing a document processing system according to the invention.
Figure 7:
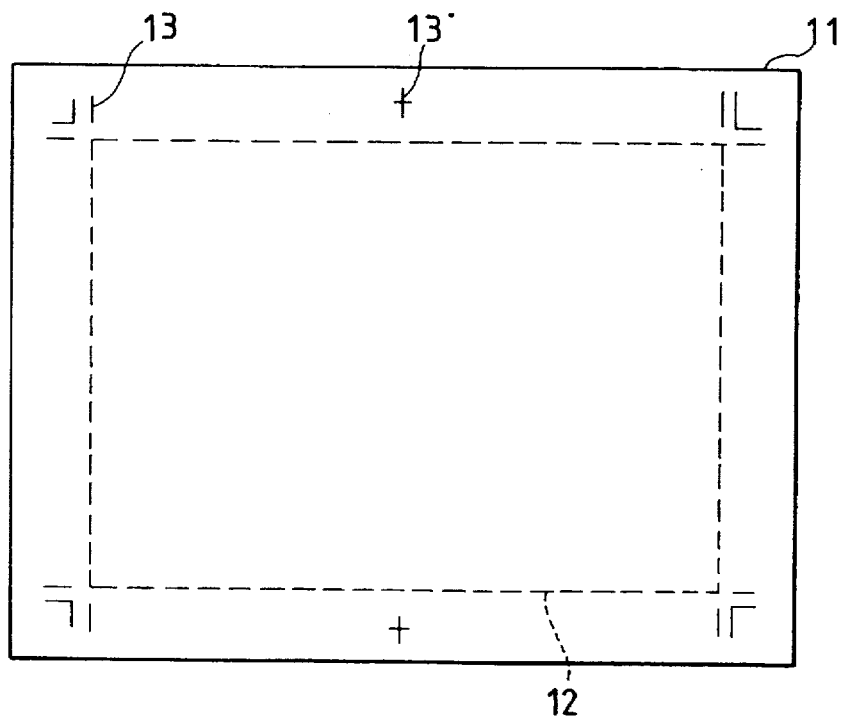
FIG. 7 is a plan view showing one example of an original document with additional data.

FIG. 1 shows one example of the arrangement of the document processing system employed in the communication system described above.

As shown in FIG. 1, the document processing system 22 comprises a CPU (central processing unit) 51, which is connected to a variety of circuit elements through a data bus 52. RAM (random access memory) 53 may be used to store data which are temporarily used in a program. A disk control unit 54 operates to control a magnetic disk 55, which may be used to store programs used by the document processing system 22, any documents formed by the system 22, or other desired data.

A key board 29 is an input means with keys (not shown) which are operated to input various data. In this embodiment, the key board 29 is connected to a mouse 31 which acts as a pointing device. A display control unit 58 controls the displaying of image data on a display unit 28, which comprises a CRT (cathode ray tube) or the like. A communication control unit 61 is connected through a communication cable 21 to other document processing systems 22 to transmit data thereto or receive data therefrom.

In the document processing system thus organized, documents are formed in single page format, page by page, in an ordinary manner. Some of the documents thus formed are subject to covered-binding printing.

Figure 3:
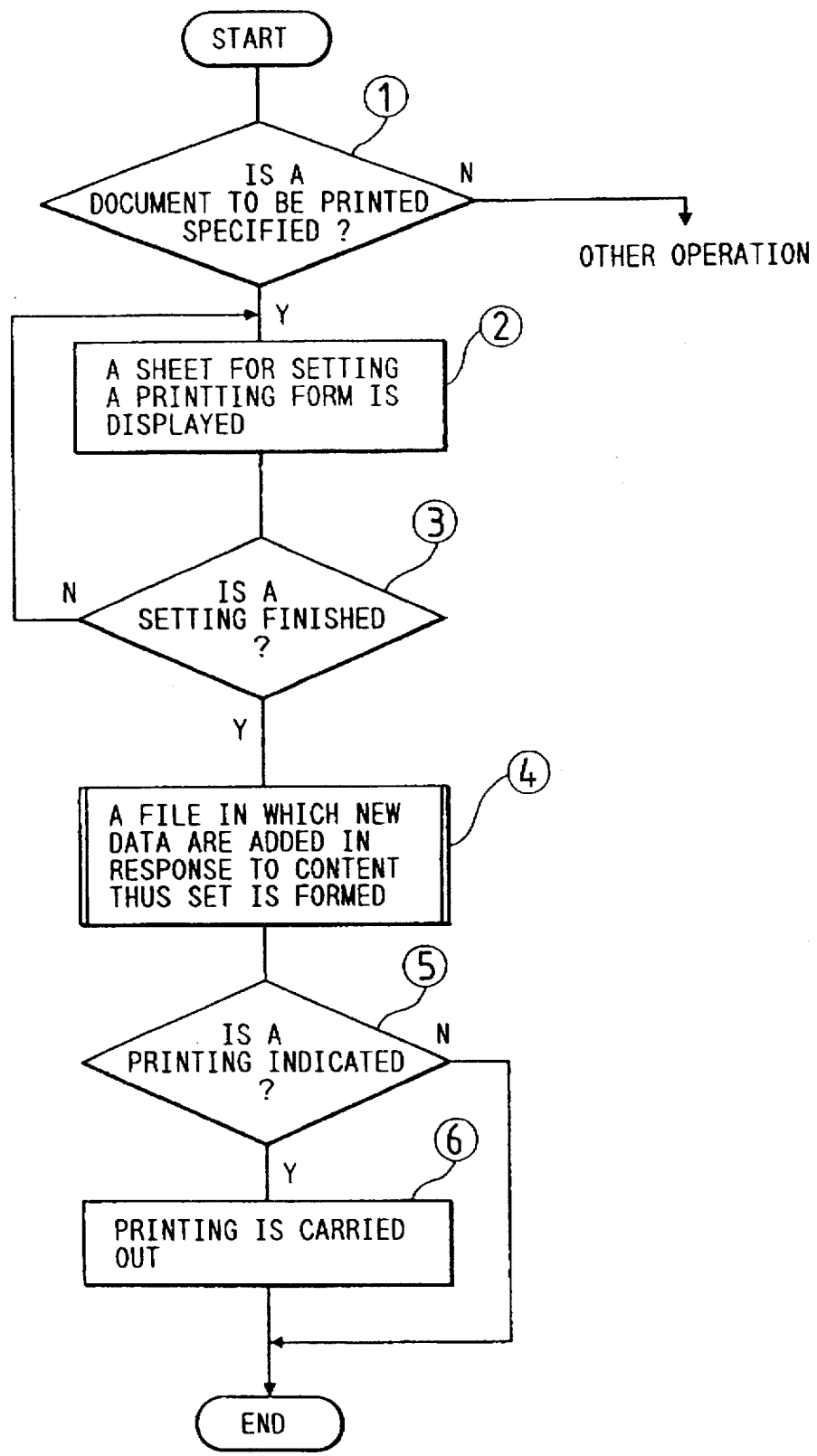
FIG. 3 is a flow chart describing the operation of the document processing system for covered-binding printing.

FIG. 3 outlines a covered-binding printing operation. The CPU 51 (FIG. 1) detects whether or not a document to be printed is specified on the display unit (Step (1)). When the operator selects an icon (not shown) representing a desired document and then selects a printer icon (not shown), the document to be printed has been specified (Y). As a result, the CPU causes the display unit 28 to display a printing form sheet (Step (2)) for selecting various desired functions.

Figures 4, 5:
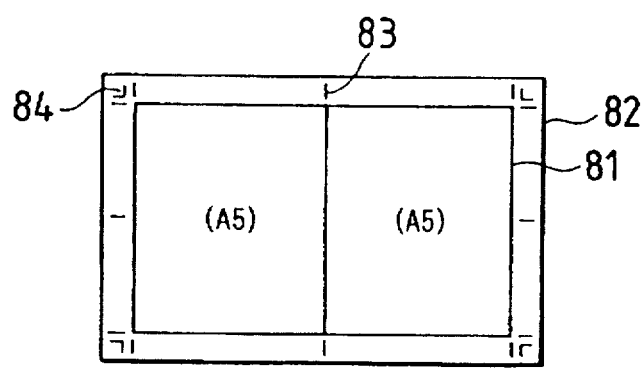
FIG. 4 is a plan view of a window indicating a printing form selection sheet.

FIG. 4 shows the contents of the sheet. The sheet is indicated in a newly opened window 71.

In the sheet, the item "Number of Copies" has two columns, the first of which is used when printing is actually carried out. In FIG. 4, "1" is entered in the first column. In this case, only one copy is printed. The second column is used only when a printing file is formed. A printing file contains processed data which is a printer readable format. When the second column is selected with the mouse 31, the numeral in the first column is changed to "0", and a file having contents corresponding to the sheet is formed for the present time.

The item "Original's Size" specifies the size of an original. In this embodiment, the size of an original is automatically detected according to the data provided when the original was formed, and indicated in the window 71.

The item "Covered Binding" indicates whether or not a covered-binding operation is desired. In the case of FIG. 4, the covered-binding operation is performed. Therefore, in the item "Covered Binding", the "Yes" is selected by clicking the mouse 31 which turns the background of the item from white into black. For a registering operation or a dovetail operation, the mouse 31 is operated in the same manner.

For the item "Sheet Size", the operator may manually specify the size of a printing sheet. In the case where the mode has been selected in which the document processing system automatically determines a printing sheet size according to the size of the original, a printing sheet size is automatically selected depending on whether the covered binding has been selected. If the operator selects a printing sheet size, then preference is given to the printing sheet size thus selected and any automatic function is overridden.

In FIG. 4, a size "A3" printing sheet is selected, for instance, because the operator intends to provide a relatively large margin around the region where the original is to be printed. However, even if a size "B4" printing sheet is selected, the covered binding of size "A5" originals can be performed.

The item "Comment" is used for memoranda in the case where the printing may be covered. Concerning the format of the printing sheet output, whether "Sorting" is required may be specified. Concerning the item "Print Format", it can be specified whether or not print format is required.

Referring back to FIG. 3, after the necessary data have been entered in the displayed sheet (Step (3); Y), a file is formed including the specified document to be printed and new data (Step (4)). When, in this case, printing has been indicated (Step (5); Y), the printing of the file thus formed is carried out (Step (6)). In the case where, as was described before, only the formation of a file is carried out (Step (5); N), the operation is ended without printing.

FIG. 5 shows the printing sheet provided in the case where the covered-binding printing is carried out with the data specified as described above. As was described with reference to FIG. 4, when the original's size is "A5" and the covered binding option selected, two pages of the size "A5" original are arranged side by side. Therefore, the whole printing area 81 is size "A4", which is twice as large as size "A5". In addition, since the registering option and the dovetail option have been selected, registering marks 83 and dovetail marks 84 are printed in the four side regions surrounding the square printing region 81 in the printing sheet 82.

Figure 6:
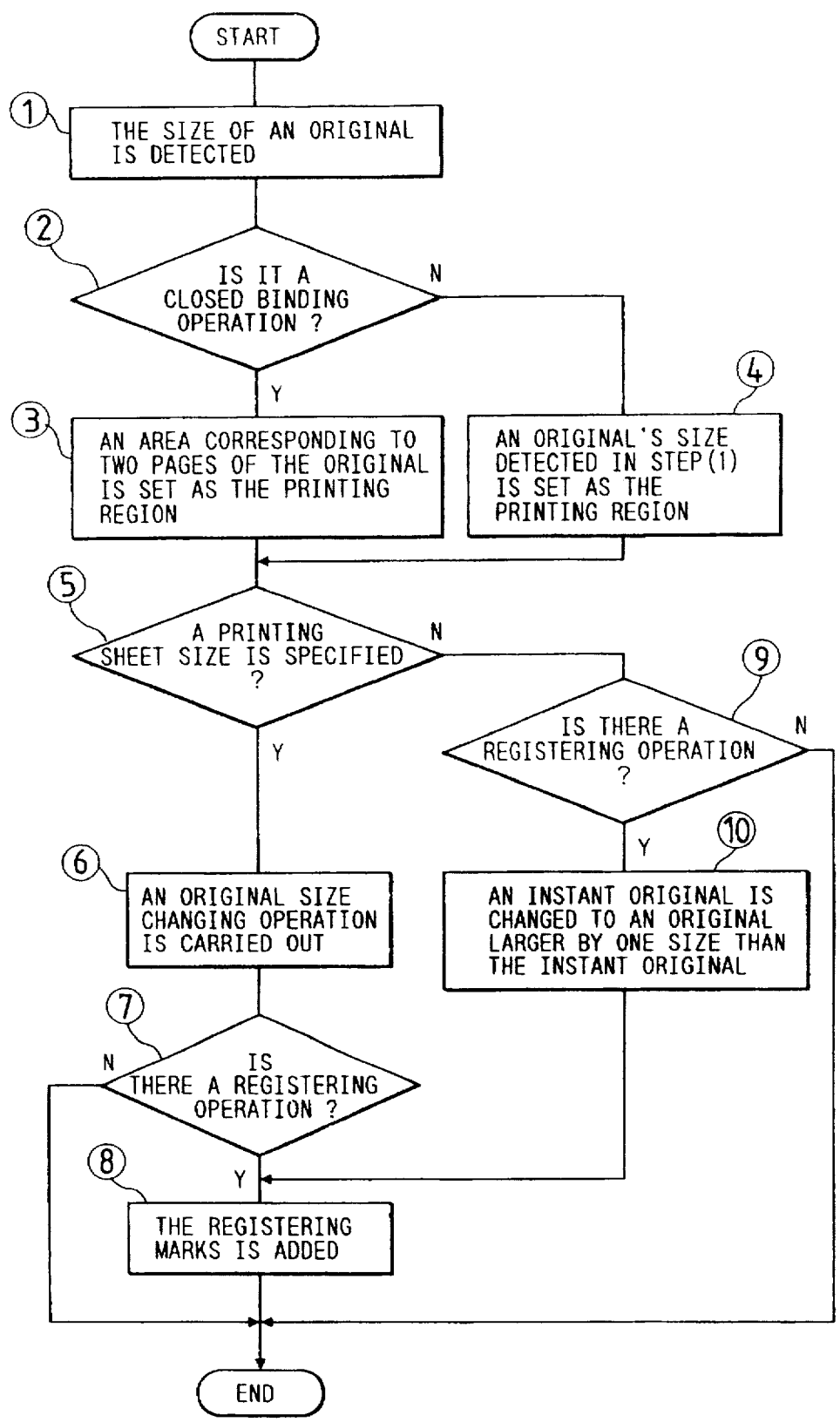
FIG. 6 is a flow chart describing the operations in Step (4) of FIG. 3 in detail.

FIG. 6 shows the operations which are carried out in Step (4) in FIG. 3 is more detail. The CPU 51 detects the size of an original (Step (1)), and then determines whether or not a covered binding operation has been specified (Step (2)). When it is determined that the covered binding operation has been specified (Y) in Step (2), an area corresponding to two pages of the original is selected as the printing region 81 (compare FIG. 4) (Step (3)). When, on the other hand, the covered binding operation has not been specified, the size of the original detected in Step (1) is selected as the printing region.

Thereafter, it is determined whether or not the operator has specified a printing sheet size (Step (5)). When it is detected that the printing sheet size has been specified by the operator (Y), an original size changing operation is carried out for the size thus specified (Step (6)). In the case in which a registering operation has been selected (Step (7)), the specified printing sheet size is chosen to be larger than the printing area, and the registering marks, or the like, are placed in the marginal region surrounding the printing region (Step (8)). The original with the added data can be displayed on display unit 28 to confirm that the desired operations will be performed. When this added data, such as registering marks, is not added (N in Step (7)), the marginal region surrounding the printing region is left blank. Additionally, the operator can write notes in the blank region by inputting data through a key board, for instance. Of course, these notes in the blank region also can be made in addition to the registering marks.

In Step (5), when a printing sheet size is not specified (N), the CPU 51 detects whether or not the addition of data, such as registering marks, is performed (Step (9)). When it is determined that the addition of data, such as registering marks, is carried out, the CPU 51 operates to form a copy one size larger than the instant original (Step (10)), to provide a marginal blank region. The data such as registering marks are placed in the marginal blank region thus provided (Step (8)).

In the case where no printing sheet size is specified, and no data such as registering marks are added (N in Step (9)), the original having the size determined in Step (3) or (4) is reproduced exactly, so that the printing is carried out according to the form of the original.

As was described above, the document formed in the ordinary manner can be converted into one for printing with ease. Therefore, the desired output document can be prepared easily from ordinary pages, without time consuming rearrangement of the printing format on the printer.

Furthermore, according to the invention, in addition to the contents of a document to be printed, other data can be displayed on the output document. Hence, not only the printing control data, such as registering marks, may be printed on the output document, but also other essential data, such as destination information, can be included.

In addition, in the case where a covered binding operation is carried out, a spread original can be readily formed by using original documents in a single page format. Furthermore, the actual appearance of a print can be confirmed on the screen by inputting the printing sheet size.

Moreover, in the invention, registering marks are employed as additional data. This makes it possible not only to correctly position printing sheets during printing, but also to mutually check the printing data by overlapping these image data or placing them side by side in the display screen prior to the actual printing operation being carried out.

In the case where the additional data includes sheet cutting position data, the cutting of the printed sheet can be achieved with ease. By overlapping these image data or placing them side by side in the display screen, the cutting positions can be mutually checked prior to the actual printing operation being carried out.

Alternatively, in the case where the additional data indicates covered-binding positions in a covered-binding printing operation, the covered-binding of the prints is remarkably improved. Similarly, by overlapping these image data and placing them side by side in the display screen, a mutual check can be given to the binding positions prior to the actual printing operation being carried out.

In the document processing system of the invention, the printing sheet selecting means performs retrieval to automatically select a printing sheet one size larger than the original. Hence, even the beginner can detect the suitable printing sheet size with ease.

Furthermore, the operator can control the operation of the printing sheet selecting means. Hence, the printing sheet size can be selected with the marginal region of the printing sheet taken into consideration.

The foregoing description of a preferred embodiments of the invention has been presented for purposes of illustration and description. It is not intended to be exhaustive or to limit the invention to the precise from disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A document processing system comprising:

detection means for detecting an original printing region size of an original document and document data contained therein;

document data forming means for adapting said document data for printing on first printing sheets having a first size corresponding to said original printing region size or another specified printing region size;

additional data forming means for forming additional data, including control data for printing;

printing sheet selecting means, connected to said document data forming means, for automatically selecting second printing sheets having a second size, said second size automatically determined to be sufficient for said additional data, including said control data, to be printed and being larger than said first size by an enlarged area;

means for printing said document data in first areas of said second printing sheets, the size of said first areas corresponding to said first size, and for printing said additional data, including said control data, in second areas of said second printing sheets, the size of said second areas corresponding to said enlarged area.

2. The document processing system of claim 1, wherein said control data indicates a correct position on said second printing sheets for a multi-color printing operation.

3. The document processing system of claim 1, wherein said control data indicates a cutting position on said second printing sheets.

4. The document processing system of claim 1, wherein said control data indicates a covered-binding position on said second printing sheets for a covered-binding printing operation.

5. The document processing system of claim 1, wherein said printing sheet selecting means includes means for automatically selecting second printing sheets having said second size which is one standard size larger than said first size.

6. The document processing system of claim 1, wherein said printing sheet selecting means comprises:

means for displaying to an operator sheet sizes which the operator may select for said second size of said second printing sheets; and printing sheet size selecting means for automatically selecting an operator selected sheet size for said second size.

7. The document processing system of claim 1, wherein said printing sheet selecting means includes means for automatically determining said second size according to said first size.

8. The document processing system of claim 1, further comprising means for combining said document data and said additional data to form output data, and means for transmitting said output data to said printing means for printing.

9. The document processing system of claim 1, wherein said first areas are centered on said second printing sheets, and said second areas comprise marginal areas disposed outside of said first areas on said second printing sheets.

* * * * *